United States Patent
Yeh et al.

(10) Patent No.: US 8,284,471 B2
(45) Date of Patent: Oct. 9, 2012

(54) TOUCH CONTROL ELECTROCHROMIC DEVICE

(75) Inventors: Yu-Chou Yeh, Taoyuan County (TW);
Chao-Yi Wang, Taoyuan County (TW);
Wen-Chih Lo, Taoyuan County (TW);
Tsung-Her Yeh, Taipei County (TW)

(73) Assignee: J Touch Corporation, Taoyuan County (TW)

( * ) Notice: Subject to any disclaimer, the term of this patent is extended or adjusted under 35 U.S.C. 154(b) by 47 days.

(21) Appl. No.: 13/044,841

(22) Filed: Mar. 10, 2011

(65) Prior Publication Data
US 2012/0134003 A1 May 31, 2012

(30) Foreign Application Priority Data
Nov. 26, 2010 (TW) ............................. 99141031 A

(51) Int. Cl.
*G02F 1/155* (2006.01)
(52) U.S. Cl. ......... 359/265; 359/268; 359/273; 359/274
(58) Field of Classification Search ........... 359/265–275
See application file for complete search history.

(56) References Cited

U.S. PATENT DOCUMENTS

| 4,505,538 A * | 3/1985 | Toussaint et al. ............. 359/274 |
| 5,206,756 A * | 4/1993 | Cheshire ....................... 359/270 |
| 2009/0027756 A1 * | 1/2009 | Ash et al. ...................... 359/265 |

FOREIGN PATENT DOCUMENTS

| TW | 200801759 | 6/1996 |
| TW | 200734782 | 3/2004 |
| TW | 200907523 | 8/2005 |

* cited by examiner

*Primary Examiner* — Evelyn A. Lester
(74) *Attorney, Agent, or Firm* — Rosenberg, Klein & Lee

(57) ABSTRACT

In a touch control electrochromic device such as a resistive or capacitive touch panel, the electrochromic device combined with a resistive touch panel includes a resistive touch panel unit having a first transparent conductive substrate and a second conductive substrate; an electrochromic material, which is a pure liquid filled into the resistive touch panel unit; an insulator installed at internal peripheries of the first transparent conductive substrate and the second conductive substrate; and a controller electrically coupled to the resistive touch panel unit for turning on/off an external power source of the electrochromic material by an external touch control signal. The resistive touch panel unit directly drives the coloration/decoloration of the electrochromic material to achieve the effect of a power saving window or smart glass.

20 Claims, 6 Drawing Sheets

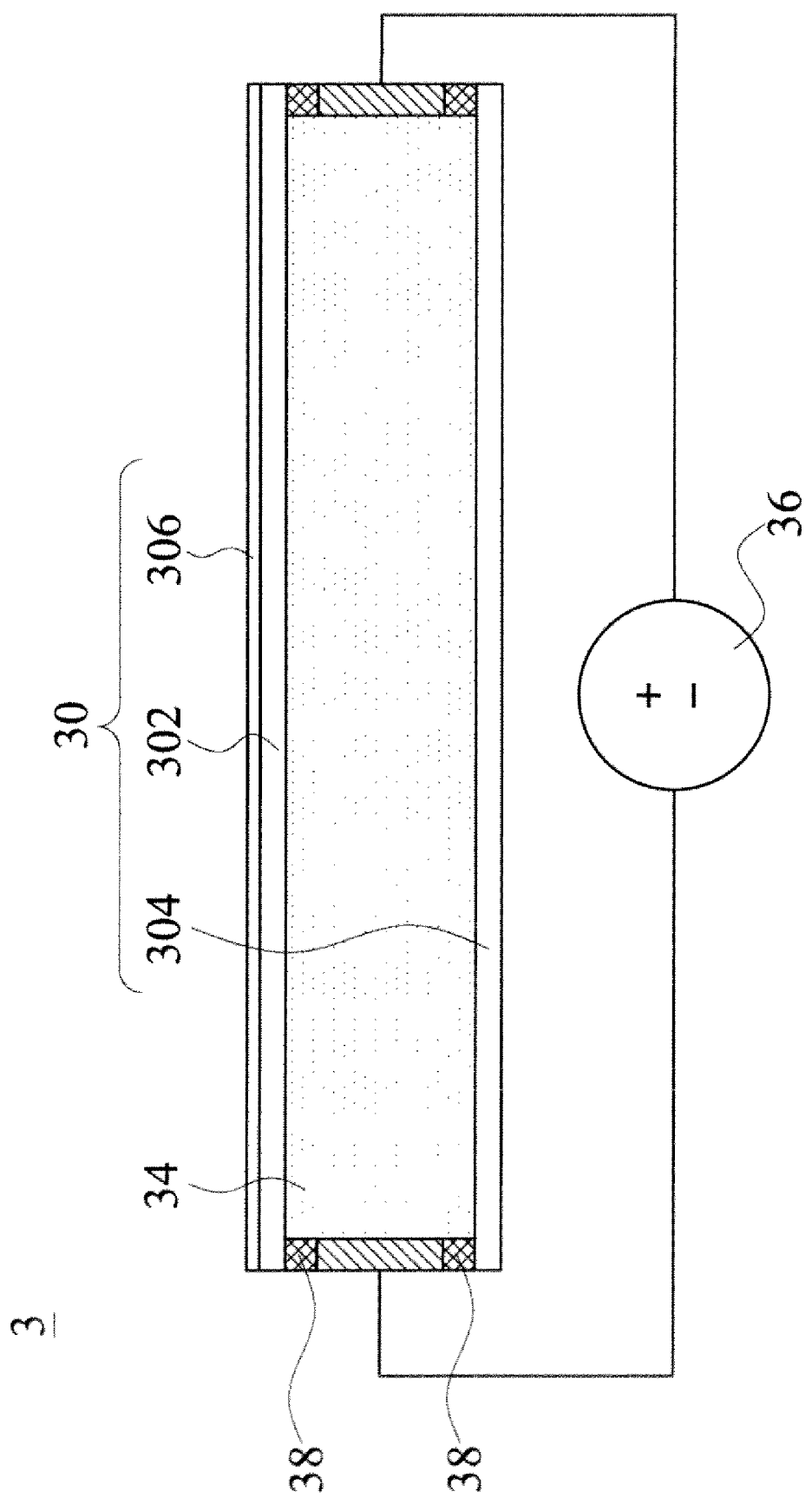

TOUCH CONTROL ELECTROCHROMIC DEVICE

CROSS-REFERENCE TO RELATED APPLICATIONS

This non-provisional application claims priority under 35 U.S.C. §119(a) on Patent Application No(s). 099141031 filed in Taiwan, R.O.C. on Nov. 26, 2010 the entire contents of which are hereby incorporated by reference.

BACKGROUND OF THE INVENTION

1. Field of the Invention

The present invention relates to the field of electrochromic applications, and more particularly to a touch control electrochromic device combined to a touch panel for driving the coloration and decoloration of an electrochromic material by a touch control method.

2. Description of the Related Art

The electrochromic material has been used extensively in different areas such as smart windows, and special applications of this sort are applied to construction glass or automobile sunroof windows for isolating radiations or solar energy of sunlight, mirrors with variable reflective index, and such application is generally applied to the rearview mirrors of an automobile, and self-emitting display with electrochromic light emission.

The electrochromicity refers to a change of color or light penetration rate of a material caused by being electrically conducted to produce chemical reactions. In 1961, the theory of electrochromic coloration/decoloration proposed by Platt indicated that electrons will have a new light absorption band (showing another color) if the electrons are excited, primarily due to the gain and loss of electrons caused by electron conversions and migration or oxidation or reduction, so as to achieve the coloration or decoloration effect. In practical applications of the material, tungsten oxide ($WO_3$) has been studied and applied extensively, and the tungsten oxide has excellent electrochromicity, whose chemical formula is given below:

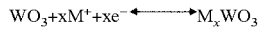

$$WO_3 + xM^+ + xe^- \leftrightarrow M_xWO_3$$

(Colorless or light yellow) (Blue or dark blue)

Where, $M^+$ stands for $H^+$, $Li^+$, $Na^+$ or $K^+$ ion. For coloration, if a positive potential is applied, reverse reaction will take place to have a decoloration. If a negative potential is applied, coloration will take place. Even after the current is disconnected, the color will still remain for a certain period before it disappears. In other words, the electrochromicity has a memory feature.

In the applications of existing power saving windows, smart glasses, and similar areas, the structure of electrochromic components as shown in FIG. 1 or 2 comprises a transparent conductive layer 12, an electrochromic layer 14 (generally in a solid state) and an electrolyte layer 16 (generally in a liquid or solid state) disposed sequentially between two transparent substrates 10; or a transparent conductive layer 12, an electrochromic layer 14 (generally in a solid state), an ion storage layer 18 (generally a solid thin film), and an electrolyte layer 16 (generally in a liquid or solid state) sequentially disposed between two transparent substrates 10, as disclosed in R.O.C. Pat. Nos. TW200734782, TW200801759 and TW200907523, In addition, an externally detachable power switch is used for operating and controlling a power supply of the electrochromic component. Based on this theory, the inventor of the present invention felt that the existing structure and power source switching for coloration and decoloration are not good enough, and thus based on years of experience in the related industry to conduct extensive researches and experiments, and finally developed a convenient touch control electrochromic device with lighter and thinner electrochromic components and a better light transmission performance.

SUMMARY OF THE INVENTION

In view of the aforementioned shortcomings, it is a primary objective of the present invention to provide a touch control electrochromic device with a lighter and thinner structure and a better light penetration than the conventional electrochromic components, in conjunction with the operating principle of a touch panel, and a power ON/Off to drive an electrochromic material of the present invention to have a coloration/decoloration for its applications in the field of power saving windows or smart glasses.

To achieve the foregoing objective, the present invention provides a touch control electrochromic device, comprising: a resistive touch panel unit, comprising: a first transparent conductive substrate; a second conductive substrate, disposed parallel to the first transparent conductive substrate, and the first transparent conductive substrate and the second conductive substrate being coupled to positive and negative terminals of a first power source respectively; and a plurality of spacers, disposed between the first transparent conductive substrate and the second conductive substrate, for preventing the first transparent conductive substrate and the second conductive substrate from being electrically coupled with each other; an electrochromic material, being a pure liquid, filled between the first transparent conductive substrate and the second conductive substrate, and both opposite distal surfaces of the electrochromic material being electrically coupled to an anode and a cathode of a second power source respectively; an insulator, installed at internal peripheries of the first transparent conductive substrate and the second conductive substrate, for preventing the anode and cathode of the second power source from being electrically coupled to the first transparent conductive substrate and the second conductive substrate, and completely packaging the electrochromic material into the resistive touch panel unit; and a controller, electrically coupled to the resistive touch panel unit, for processing an external touch control signal to drive the second power source to be turned on or off.

Wherein, the first transparent conductive substrate is a transparent substrate whose surface is coated with an electrically conductive material such as glass, polyethylene terephthalate (PET), polycarbonate (PC), polyethylene (PE), polyvinyl chloride (PVC), polypropylene (PP), polystyrene (PS), and polymethylmethacrylate (PMMA) containing) indium tin oxide (ITO), indium zinc oxide (IZO), Al-doped ZnO (AZO), antimony tin oxide (ATO), carbon nanotube, poly-3,4-ethylenedioxythiophene (PEDOT) or polyaniline, or a plastic polymer selected from a mixed combination of the above, so as to comply with the transparent conductive feature. In the smart window or power saving window of a preferred embodiment, the second conductive substrate is made of a transparent material. In the mirror of a preferred embodiment, the second conductive substrate is made of an opaque reflective material.

In the present invention, the electrochromic material in form of a pure solution filled in the resistive touch panel unit is comprised of an organic material, an inorganic material and a solvent, and the electrochromic material further comprises a mixed solution of several organic and inorganic materials in addition to an organic material and at least one inorganic material. The organic material is selected from the collection of a redox indicator, a pH indicator and an organic compound; the redox indicator is one selected from the collection of methylene blue ($C_{16}H_{18}ClN_3S.3H_2O$), dichlorophenolindophenol sodium ($C_{12}H_6C_{12}NNaO_2$), N-phenylanthranilic acid ($C_{13}H_{11}NO_2$), diphenylamine sulfonate, N,N'-Diphenylbenzidine ($C_{20}H_{20}N_2$) and viologen; the pH indicator is variamine blue B diazonium salt ($C_{13}H_{12}ClN_3O$); and the organic compound is one selected from the collection of ferrocene ($Fe(C_5H_5)_2$) and 7,7,8,8-tetracyanoquinodimethane. The inorganic material is one selected from of the collection of an oxide, a sulfide, a chloride and a hydroxide of a transition element; the transition element is one selected from the collection of a scandium subgroup, a titanium subgroup, a vanadium subgroup, a chromium subgroup, a manganese subgroup, an iron series, a copper subgroup, a zinc subgroup and a platinum subgroup. The inorganic material is one selected from of the collection of a halogen group inorganic derivative, an oxygen group inorganic derivative, a nitrogen group inorganic derivative, a carbon group inorganic derivative, a boron group inorganic derivative, an alkaline earth group inorganic derivative and an alkali metal group inorganic derivative. The inorganic material can be one selected from of the collection of ferrous oxide ($FeCl_2$), ferric oxide ($FeCl_3$), titanium trioxide ($TiCl_3$), titanium tetraoxide ($TiCl_4$), bismuth chloride ($BiCl_3$), copper chloride ($CuCl_2$) and lithium bromide (LiBr). The solvent is one or a mixed combination selected from the collection of dimethyl sulfoxide [$(CH_3)_2SO$], Propylene carbonate ($C_4H_6O_3$), water, gamma-butyrolactone, acetonitrile, propionitrile, benzonitrile, pentanedinitrile, methyl pentanedinitrile, 3,3'-dimethoxy propionitrile, hydroxyl propionitrile, dimethylformamide, N-methyl pyrrolidine, tetramethylene sulfone, 3-methyl tetramethylene sulfone.

The electrochromic material in form of a solution is in a gel state that reduces the liquid flow and causes a leakage problem, and the change of color can be more uniform, and the grating line will not be deformed easily by external forces. Therefore, the electrochromic material further comprises an electrolyte or a high polymer.

To achieve the foregoing objective, the present invention also provides a touch control electrochromic device, comprising: a capacitive touch panel unit, comprising: a third transparent conductive substrate; a fourth substrate, disposed parallel to the third transparent conductive substrate; and an electrochromic material, being a pure liquid, filled between the third transparent conductive substrate and the fourth substrate, and both opposite distal surfaces of the electrochromic material being electrically coupled to an anode and a cathode of a third power source respectively; an insulator, installed at internal peripheries of the third transparent conductive substrate and the fourth substrate, for isolating the anode and the cathode of the third power source from electrically coupling the third transparent conductive substrate and the fourth substrate and completely packaging the electrochromic material into the capacitive touch panel unit; and a controller, electrically coupled to the resistive touch panel unit, for processing an external touch control signal to drive the second power source to be turned on or off.

To enhance the scratch resistance and using life of the product, a protective layer is further provided and installed on a surface of the third transparent conductive substrate, wherein the protective layer can be made of a glass, plastic or silica material.

The present invention provides a touch control electrochromic device that adopts the principle of existing resistive touch panels or capacitive touch panels and fills an electrochromic material in form of a pure solution into the touch panel. Unlike the conventional electrochromic component structure that generally adds an electrolyte layer onto the electrochromic layer or an additional ion storage layer, the present invention comes with a thinner overall structure with a self-cleaning function and a better light penetration performance. On the other hand, the coloration/decoloration of the electrochromic material operated and controlled by the ON/OFF of a power supply can be operated directly on the touch panel, so that when the smart window or glass is operated, the light transmission rate can be controlled and adjusted or the reflection can be achieved easier, so as to improve the convenience and simplicity of the application significantly.

BRIEF DESCRIPTION OF THE DRAWINGS

FIG. 7 is a schematic structural view of a touch control electrochromic device combined to a capacitive touch panel in accordance with the present invention.

DETAILED DESCRIPTION OF THE PREFERRED EMBODIMENTS

The technical characteristics and effects of the present invention will be apparent with the detailed description of preferred embodiment together with the illustration of related drawings as follows.

Figure 1:
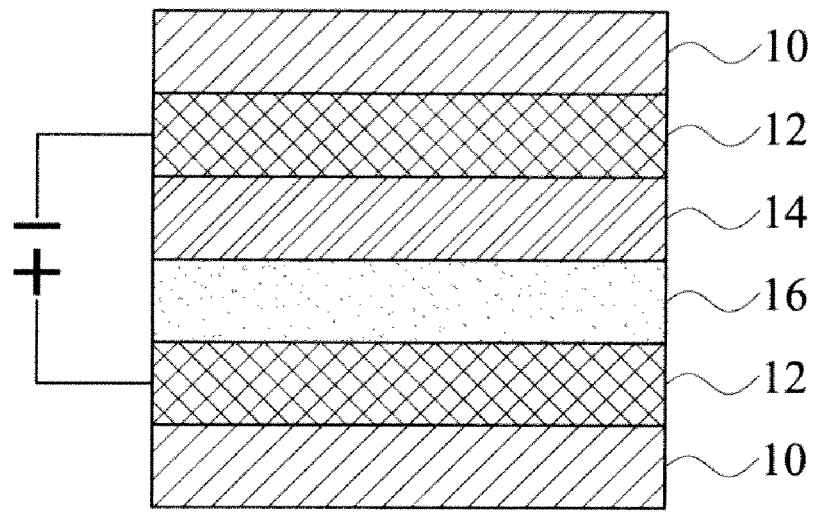
FIG. 1 is a schematic structural view of a conventional electrochromic component.
Figure 2:
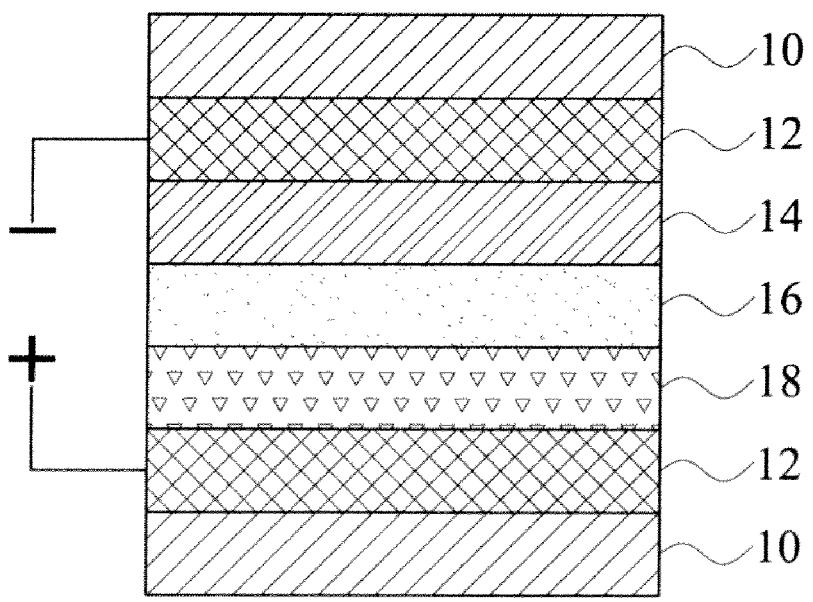
FIG. 2 is a schematic structural view of another conventional electrochromic component.
Figure 3:
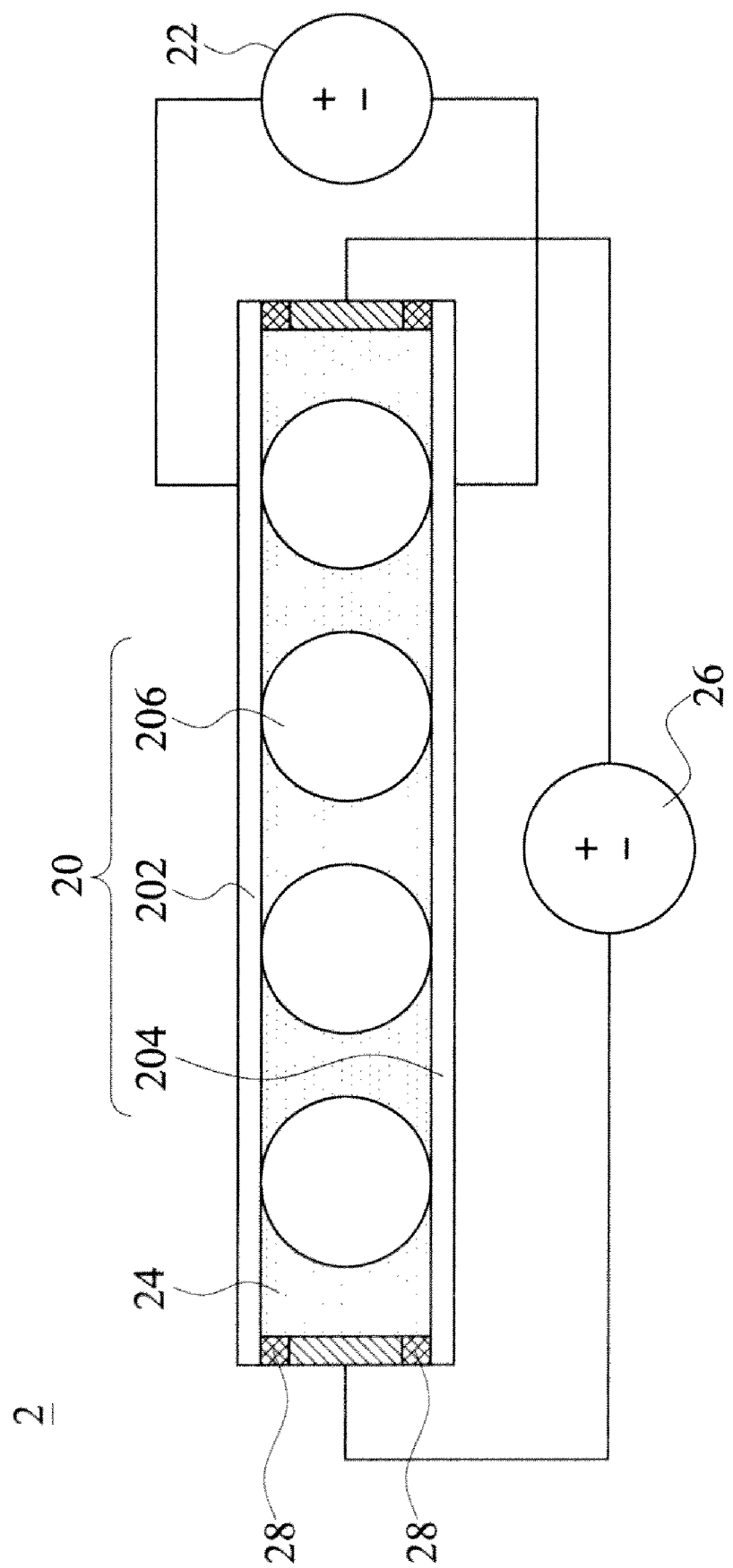
FIG. 3 is a schematic structural view of a touch control electrochromic device of the present invention.

With reference to FIG. 3 for a schematic structural view of a touch control electrochromic device of the present invention, the touch control electrochromic device 2 comprises: a resistive touch panel unit 20, an electrochromic material 24, an insulator 28 and a controller (not shown in the figure). The resistive touch panel unit 20 is basically a general resistive touch panel in this invention, so that the resistive touch panel unit 20 of the present invention comprises a first transparent conductive substrate 202, a second conductive substrate 204 and a plurality of spacers 206, wherein the first transparent conductive substrate 202 is a transparent substrate whose surface is coated with an electrically conductive material such as indium tin oxide (ITO) conductive glass or ITO plastic film, or an electrically conductive material selected from the collection of glass, polyethylene terephthalate (PET), polycarbonate (PC), polyethylene (PE), polyvinyl chloride (PVC), polypropylene (PP), polystyrene (PS), and polymethylmethacrylate (PMMA) having indium tin oxide (ITO), indium zinc oxide (IZO), Al-doped ZnO (AZO), antimony tin oxide (ATO), poly-3,4-ethylenedioxythiophene (PEDOT), polyaniline or carbon nanotube, or a mixed combination of the above. The second conductive substrate 204 is disposed parallel to the first transparent conductive substrate 202, and the first transparent conductive substrate 202 and the second conductive substrate 204 are coupled to positive and negative terminals of a first power source 22 respectively. In general, the first transparent conductive substrate 202 and the second conductive substrate 204 generally adopt a voltage of +5V as their voltage difference. A spacer 206 is disposed between the first transparent conductive substrate 202 and the second conductive substrate 204 for separating the two conductive substrates 202, 204 and preventing a short circuit caused by touching them accidentally.

The electrochromic material 24 is in form of a pure liquid and filled between the first transparent conductive substrate 202 and the second conductive substrate 204. The first power source 22 of the resistive touch panel unit 20 has a voltage difference of +5V, and the current provided for the touch control function falls within a range that will not drive the electrochromic coloration, and thus the coloration/decoloration of the electrochromic material 24 will not occur. Both opposite distal surface of the electrochromic material 24 are electrically and respectively coupled to an anode and a cathode of a second power source 26 to supply sufficient voltage and current for driving the coloration/decoloration of the electrochromic material 24.

Since the electrochromic material 24 is a pure liquid, therefore after the electrochromic material 24 is filled between the first transparent conductive substrate 202 and the second conductive substrate 204, it is necessary to install the insulator 28 at internal peripheries of the first transparent conductive substrate 202 and the second conductive substrate 204 for isolating the anode and the cathode of the second power source 26 from electrically coupling the first transparent conductive substrate 202 and the second conductive substrate 204, while completely packaging the electrochromic material 24 into the resistive touch panel unit. The electrochromic material 24 is comprised of at least one organic material, at least one inorganic material and a solvent, wherein the organic material is one selected from the collection of a redox indicator, a pH indicator and an organic compound.

The redox indicator is one selected from the collection of methylene blue ($C_{16}H_{18}ClN_3S.3H_2O$), dichlorophenolindophenol sodium ($C_{12}H_6C_{12}NNaO_2$), N-phenylanthranilic acid ($C_{13}H_{11}NO_2$), diphenylamine sulfonate ($C_{12}H_{10}NNaO_3S$), N,N'-Diphenylbenzidine ($C_{20}H_{20}N_2$) and viologen; the viologen may have a different color due to a different length of carbon chain or a different structure of the R substituent, and the R substituent can be Methyl, Ethyl, Propyl, Butyl, Pentyl, Hexyl, Heptyl, Octyl, Iso-pentyl, or Benzyl, and can be 1,1'-dimethyl-4,4'-bipyridinium dichloride hydrate (MV), 1,1'-diheptyl-4,4'-bipyridinium dibromide (HV), 1,1'-dibenzyl-4,4'-bipyridinium dichloride hydrate (BV), 1,1'-bis(2,4-dinitrophenyl)-4,4'-bipyridinium dichloride, 1,1'-di-n-octyl-4,4'-bipyridinium dibromide, octyl), 1,1'-diphenyl-4,4'-bipyridinium dichloride, and 4,4'-bipyridyl in this preferred embodiment.

The pH indicator can be variamine blue B diazonium salt ($C_{13}H_{12}ClN_3O$).

The organic compound is ferrocene ($Fe(C_5H_5)_2$) or 7,7,8,8-Tetracyanoquinodimethane.

The inorganic material is one selected from the collection of an oxide, a sulfide, a chloride and a hydroxide of a transition element; the transition element is one selected from the collection of a copper subgroup (IB), a zinc subgroup (IIB), a scandium subgroup (IIIB), a titanium subgroup (IVB), a vanadium subgroup (VB), a chromium subgroup (VIB), a manganese subgroup (VIIB), an iron series (VIIIB) and platinum series (Group VIIIB of fifth and sixth periods). The inorganic material is one selected from the collection of a halogen group (VIIA) inorganic derivative, an oxygen group (VIA) inorganic derivative, a nitrogen group (VA) inorganic derivative, a carbon group (VIA) inorganic derivative, a boron group (IIIA) inorganic derivative, an alkaline earth group (IIA) inorganic derivative and an alkali metal group (IA) inorganic derivative. The inorganic material is one selected from the collection of ferrous oxide ($FeCl_2$), ferric oxide ($FeCl_3$), titanium trioxide ($TiCl_3$), titanium tetraoxide ($TiCl_4$), bismuth chloride ($BiCl_3$), copper chloride ($CuCl_2$) and lithium bromide (LiBr). The solvent is one selected from the collection of dimethyl sulfoxide [$(CH_3)_2SO$], propylene carbonate($C_4H_6O_3$), water, gamma-butyrolactone, acetonitrile, propionitrile, benzonitrile, pentanedinitrile, methyl pentanedinitrile, 3,3'-dimethoxy propionitrile, hydroxyl propionitrile, dimethylformamide, N-methyl pyrrolidine, tetramethylene sulfone, and 3-methyl tetramethylene sulfone or a mixture of the above. Any one or a mixed combination of the organic material, inorganic material and solvent can be used as the material to achieve the objective of the present invention.

The electrochromic material 24 further comprises at least one inert conductive salt, and the inert conductive salt can be a lithium, sodium or tetra-alkyl ammonium salt.

The electrochromic material 24 is in a liquid state, and thus there is a leakage issue. The grating lines produced during the color change of the electrochromic material 24 may be deformed easily by an external slight force, so that the electrochromic material 24 further includes an electrolyte or a high polymer to overcome the aforementioned problem, and the uniformity of coloration is better than that of the pure solution. The electrolyte can be lithium perchlorate ($LiClO_4$), potassium hydroxide (KOH), sodium hydroxide (NaOH) or sodium silicate ($Na_2SiO_3$); the high polymer can be highly fluorinated resin, poly(2-acrylamido-2-methyl-1-propanesulfonic acid (PAMAS), poly(vinylalcohol phosphoric acid (PAVA), polyethylene oxide (PEO), polyethyleneimine (PEI), tetrabutylammonium tetrafluoroborate, polymethylmethacrylate (PMMA), Phenyl acid phosphate (PAP), or polyvinyl pyrrolidone (PVP) or a mixture of the above.

Figure 4:
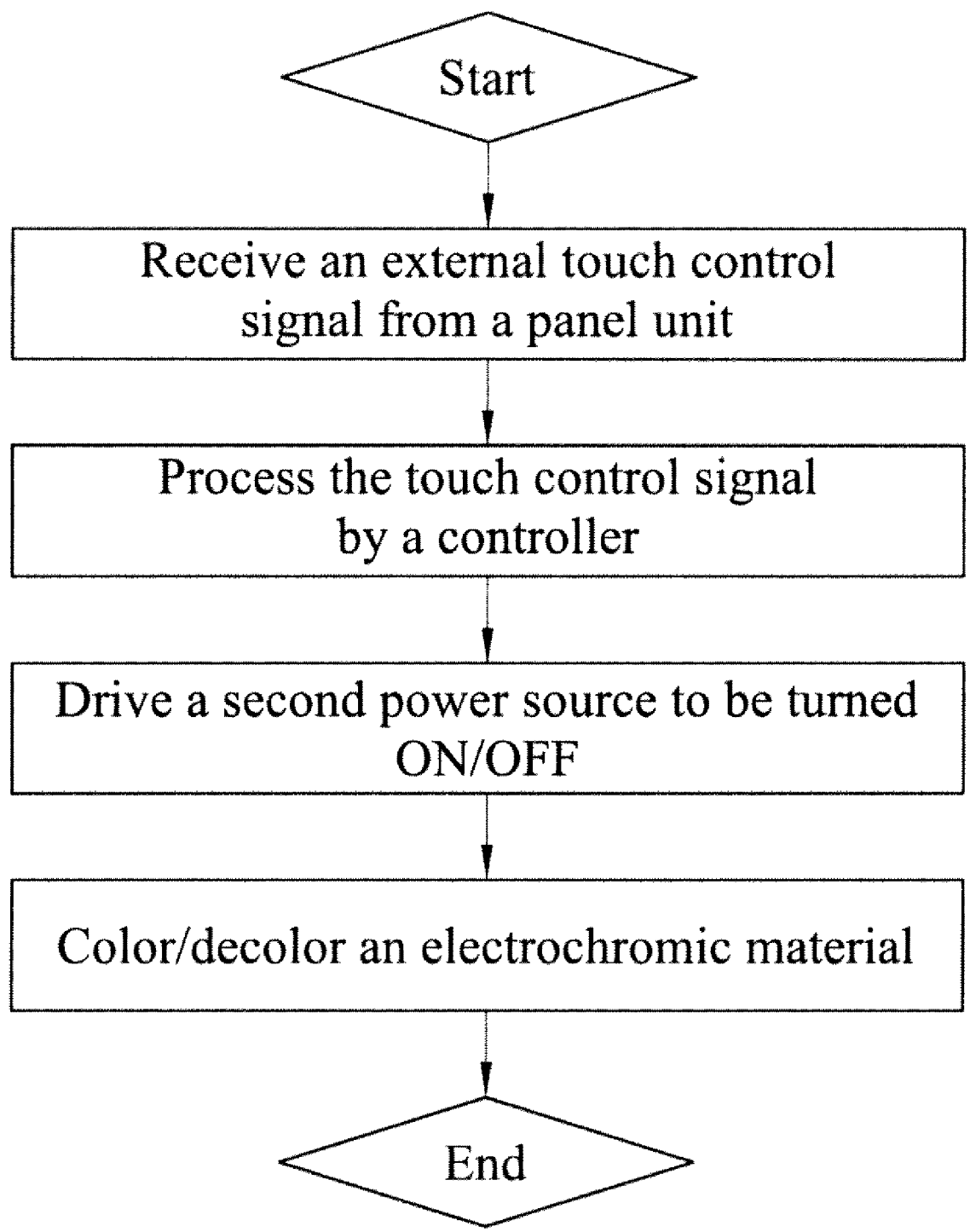
FIG. 4 is a flow chart of operating a touch control electrochromic device of the present invention.

With reference to FIG. 4 for a flow chart of the operation of a touch control electrochromic device in accordance with the present invention, the touch control of the resistive touch panel unit 20 can be operated directly to achieve the coloration/decoloration of the electrochromic material 24. Firstly, an user touches the resistive touch panel unit 20 by a finger or any other pressing object to generate an external touch control signal, and then a controller electrically coupled to the resistive touch panel unit 20 processes the external touch control signal, such as converting an analog signal into a digital signal, and then the processed external touch control signal drives the second power source 26 to be turned on or off, and a chemical reaction for the coloration or decoloration of the electrochromic material 24 takes place.

Figure 5B:
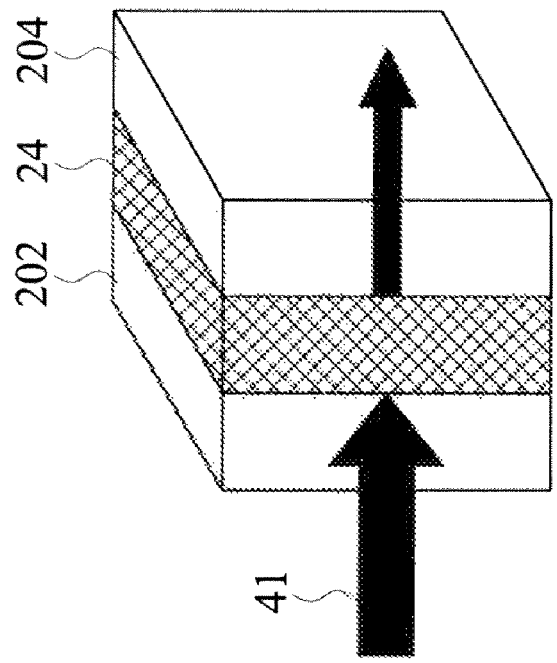
FIGS. 5A and 5B for schematic structural views of a touch control electrochromic device applied to a transmissive component in accordance with the present invention.
Figure 5A:
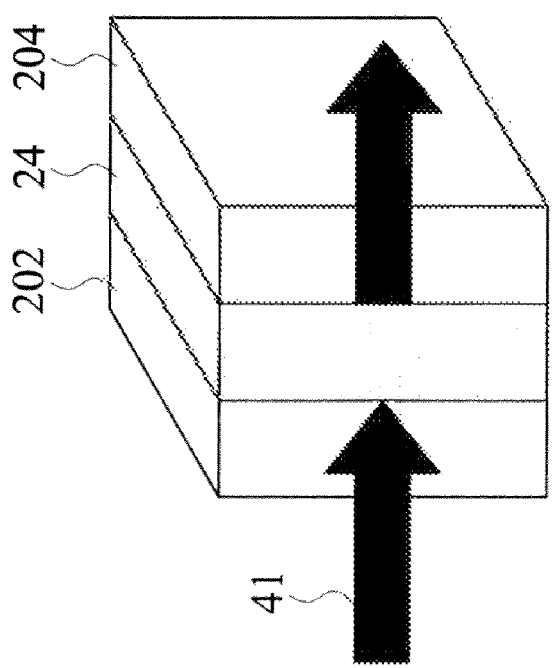

With reference to FIGS. 5A and 5B for schematic structural views of a touch control electrochromic device applied to a transmissive component in accordance with the present invention, the first transparent conductive substrate 202 and the second conductive substrate 204 are transparent materials such as the ITO glass with high light penetration and electrical conductivity. In practical applications of products such as smart windows and filter windows, the situation similar to a light 41 penetrating through a transparent material takes place before the coloration of the electrochromic material 24 occurs, even if the intensity of the light 41 is attenuated. After the coloration of the electrochromic material 24 occurs, the intensity of the light 41 passing through the electrochromic material 24 will be attenuated significantly. The level of light penetration (or attenuation) can be determined by the potential difference between the first transparent conductive substrate 202 and the second conductive substrate 204, the pH value of the solution, the concentration of the solution, the solvent polarity, the electrode gap, and the dielectric constant.

Figure 6B:
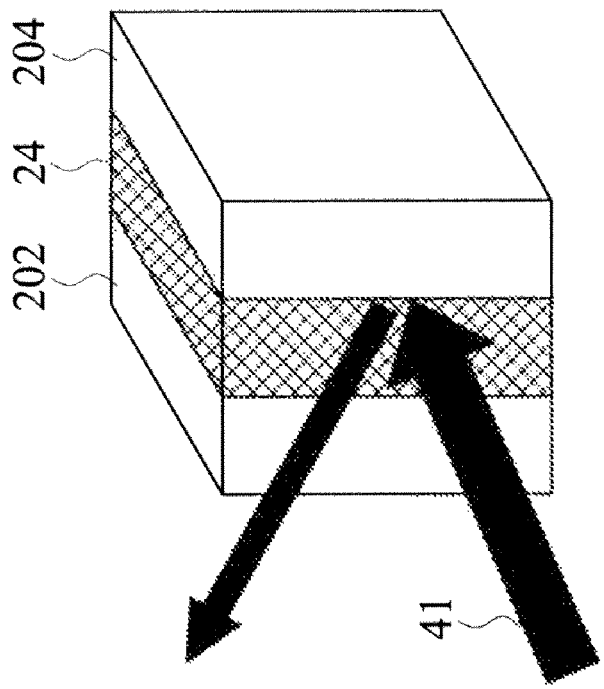
FIGS. 6A and 6B are schematic structural views of a touch control electrochromic device applied to a reflective component in accordance with the present invention.
Figure 6A:
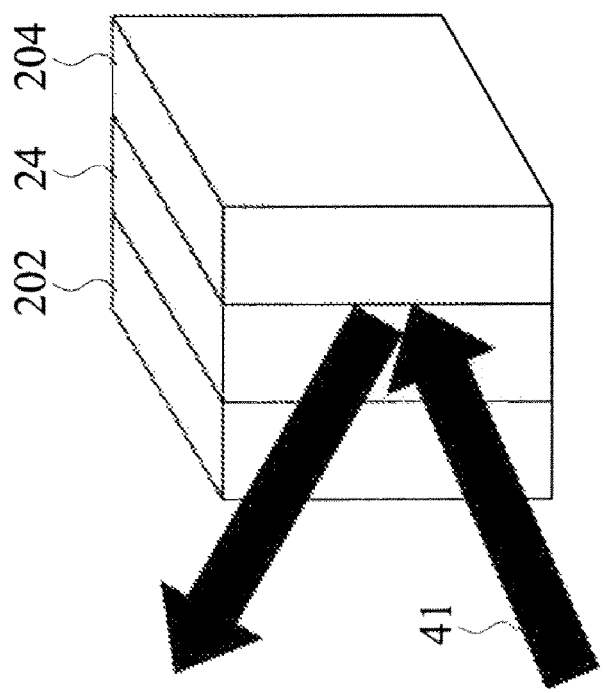

With reference to FIGS. 6A and 6B for schematic structural views of a touch control electrochromic device applied to a reflective component in accordance with the present invention, the first transparent conductive substrate 202 is a transparent material such as the ITO glass with high light penetration and electrical conductivity, and the second conductive substrate 204 is an opaque reflective material such as platinum, rhodium alloy, or similar reflective layer in this preferred embodiment. For example, the touch control electrochromic device can be applied to products such as the antiglare rearview mirrors. In FIGS. 6A and 6B, before the coloration of the electrochromic material 24 occurs, the light 41 is reflected directly, and thus there is no substantial effect on the attenuation of the light intensity. After the coloration of the electrochromic material 24 occurs, the intensity of the light 41 passing through the electrochromic material 24 is attenuated significantly. Therefore, the intensity of a strong light 41 is attenuated greatly after its reflection. The level of light penetration (or attenuation) can be determined by the potential difference between the first transparent conductive substrate 202 and the second conductive substrate 204, the pH value of the solution, the concentration of the solution, the solvent polarity, the electrode gap, and the dielectric constant.

In FIGS. 3 to 6B, the electrochromic material in conjunction with the resistive touch panel used for driving the power source of the electrochromic material is illustrated. With reference to FIG. 7 for a schematic structural view of a touch control electrochromic device combined with a capacitive touch panel in accordance with the present invention, the power source of the electrochromic material is driven by a method of using the touch panel, except that the type of the touch panel is a capacitive touch panel. In FIG. 7, the touch control electrochromic device 3 of this preferred embodiment comprises: a capacitive touch panel unit 30, an electrochromic material 34, an insulator 38 and a controller (not shown in the figure). The capacitive touch panel unit 30 comprises: a third transparent conductive substrate 302 and a fourth substrate 304, wherein the fourth substrate 304 is disposed parallel to the third transparent conductive substrate 302. The electrochromic material 34 of this preferred embodiment is the same as that of the previous preferred embodiment, which is a pure liquid filled between the third transparent conductive substrate 302 and the fourth substrate 304, or in a gel state which is the same as the embodiment of the resistive touch panel unit, wherein an electrolyte or a high polymer is doped into the electrochromic material 34. The process is the same as the abovementioned material, and thus will not be described here again. Both opposite distal surfaces of the electrochromic material 34 are respectively and electrically coupled to an anode and a cathode of a third power source 36. The operation of the insulator 38 and the structure of the controller are substantially the same as those described in the preferred embodiment of the resistive touch panel, and thus will not be described here again. For example, the fourth substrate 304 does not have the electrically conducting function and it is a transparent substrate or a reflective substrate, such that the electrochromic material 34 can use its change of color to achieve the applications of the smart window, glass, and mirror. To improve the anti-scratch and using life of the product, a protective layer 306 is provided and installed on a surface of the third transparent conductive substrate 302 to prevent the third transparent conductive substrate 302 from being scratched or damaged after many times of touches. The protective layer 306 can be made of a glass, plastic or silica material.

In summation of the description of the preferred embodiments above, the present invention provides the touch control electrochromic device that uses the principle of existing resistive touch panels or capacitive touch panels to fill the electrochromic material in form of a pure solution into the touch control electrochromic device, unlike the conventional electrochromic component structure that adds an electrolyte layer onto the electrochromic layer or adds an additional ion storage layer, so that the present invention has a thinner overall structure and a better light penetration. In addition, the ON/OFF of the power source required by the coloration/decoloration of the electrochromic material can be controlled and operated directly from the touch panel, so that the light transmission rate can be controlled and adjusted easily and the reflection can be achieved easily when the touch control electrochromic device is applied to the smart window or glass. The invention can improve the convenience and simplicity significantly.

In summation of the description above, the touch control electrochromic device in accordance with the present invention complies with the patent application requirements, and thus is duly filed for patent application.

While the invention has been described by means of specific embodiments, numerous modifications and variations could be made thereto by those generally skilled in the art without departing from the scope and spirit of the invention set forth in the claims.

What is claimed is:

1. A touch control electrochromic device, comprising:
   a resistive touch panel unit, comprising:
   a first transparent conductive substrate;
   a second conductive substrate, disposed parallel to the first transparent conductive substrate, and the first transparent conductive substrate and the second conductive substrate being coupled to positive and negative terminals of a first power source respectively; and
   a plurality of spacers, disposed between the first transparent conductive substrate and the second conductive substrate, for preventing the first transparent conductive substrate and the second conductive substrate from being electrically coupled with each other;
   an electrochromic material, being a pure liquid, filled between the first transparent conductive substrate and the second conductive substrate, and both opposite distal surfaces of the electrochromic material being electrically coupled to an anode and a cathode of a second power source respectively;
   an insulator, installed at internal peripheries of the first transparent conductive substrate and the second conductive substrate, for isolating the anode and cathode of the second power source from electrically coupling the first transparent conductive substrate and the second conductive substrate, and completely packaging the electrochromic material into the resistive touch panel unit; and
   a controller, electrically coupled to the resistive touch panel unit, for processing an external touch control signal to drive the second power source to be turned on or off.

2. The touch control electrochromic device of claim 1, wherein the first transparent conductive substrate is made of an electrically conductive material selected from the collection of glass, polyethylene terephthalate, polycarbonate, polyethylene, polyvinyle chloride, polypropylene, polystyrene, polymethylmethacrylate (PMMA) containing indium tin oxide (ITO), indium zinc oxide (IZO), Al-doped ZnO (AZO), antimony tin oxide (ATO), carbon nanotube, Poly (3,4-ethylenedioxythiophene) or polyaniline, or a mixed combination of plastic polymers selected from the same collection.

3. The touch control electrochromic device of claim 1, wherein the second conductive substrate is made of a transparent material.

4. The touch control electrochromic device of claim 1, wherein the second conductive substrate is an opaque reflective material.

5. The touch control electrochromic device of claim 1, wherein the electrochromic material is composed of an organic material, an inorganic material and a solvent.

6. The touch control electrochromic device of claim 5, wherein the organic material is one or a mixed combination selected from the collection of a redox indicator, a pH indicator and an organic compound.

7. The touch control electrochromic device of claim 6, wherein the redox indicator is one selected from the collection of methylene blue ($C_{16}H_{18}ClN_3S \cdot 3H_2O$), dichlorophenolindophenol sodium ($C_{12}H_6C_{12}NNaO_2$), N-phenylanthranilic acid ($C_{13}H_{11}NO_2$), diphenylamine sulfonate, N,N'-diphenylbenzidine ($C_{20}H_{20}N_2$) and viologen.

8. The touch control electrochromic device of claim 6, wherein the pH indicator is variamine blue B diazonium salt ($C_{13}H_{12}ClN_3O$).

9. The touch control electrochromic device of claim 6, wherein the organic compound is one selected from the collection of 7,7,8,8-tetracyanoquinodimethane and ferrocene ($Fe(C_5H_5)_2$).

10. The touch control electrochromic device of claim 5, wherein the inorganic material is one or a mixed combination selected from the collection of an oxide, a sulfide, a chloride and a hydroxide of a transition element.

11. The touch control electrochromic device of claim 5, wherein the inorganic material is one or a mixed combination selected from the collection of a halogen group inorganic derivative, an oxygen group inorganic derivative, a nitrogen group inorganic derivative, a carbon group inorganic derivative, a boron group inorganic derivative, an alkaline earth group inorganic derivative and an alkali metal group inorganic derivative.

12. The touch control electrochromic device of claim 5, wherein the inorganic material is one selected from the collection of ferrous oxide, ferric oxide, titanium trioxide, titanium tetraoxide, bismuth chloride, copper chloride and lithium bromide.

13. The touch control electrochromic device of claim 5, wherein the solvent is one or a mixture selected from the collection of dimethyl sulfoxide, propylene carbonate, water, gamma-butyrolactone, acetonitrile, propionitrile, benzonitrile, pentanedinitrile, methyl pentanedinitrile, 3,3'-dimethoxy propionitrile, hydroxyl propionitrile, dimethylformamide, N-methyl pyrrolidine, tetramethylene sulfone, 3-methyl tetramethylene sulfone.

14. The touch control electrochromic device of claim 5, wherein the electrochromic material further comprises at least one inert conductive salt.

15. The touch control electrochromic device of claim 5, wherein the electrochromic material further comprises an electrolyte or a high polymer.

16. The touch control electrochromic device of claim 15, wherein the electrolyte is one selected from the collection of lithium perchlorate, potassium hydroxide, sodium hydroxide and sodium silicate.

17. The touch control electrochromic device of claim 15, wherein the high polymer is one or a mixture selected from the collection of highly fluorinated resin, poly(2-acrylamido-2-methyl-1-propanesulfonic acid (PAMAS), poly(vinylalcohol phosphoric acid (PAVA), polyethylene oxide (PEO), polyethyleneimine (PEI), tetrabutylammonium tetrafluoroborate, polymethylmethacrylate (PMMA), phenyl acid phosphate (PAP) and polyvinyl pyrrolidone (PVP).

18. A touch control electrochromic device, comprising:
   a capacitive touch panel unit, including;
   a third transparent conductive substrate;
   a fourth substrate, disposed parallel to the third transparent conductive substrate; and
   an electrochromic material, being a pure liquid, filled between the third transparent conductive substrate and the fourth substrate, and both opposite distal surfaces of the electrochromic material being electrically coupled to an anode and a cathode of a third power source respectively;
   an insulator, installed at internal peripheries of the third transparent conductive substrate and the fourth substrate, for isolating the anode and the cathode of the third power source from electrically coupling the third transparent conductive substrate and the fourth substrate and completely packaging the electrochromic material into the capacitive touch panel unit; and
   a controller, electrically coupled to the resistive touch panel unit, for processing an external touch control signal to drive the second power source to be turned on or off.

19. The touch control electrochromic device of claim 18 wherein the capacitive touch panel unit further comprises a protective layer disposed on a surface of the third transparent conductive substrate.

20. The touch control electrochromic device of claim 19, wherein the protective layer is made of a glass, plastic or silica material.

* * * * *